US008261070B2

(12) United States Patent
Angus et al.

(10) Patent No.: US 8,261,070 B2
(45) Date of Patent: Sep. 4, 2012

(54) AUTHENTICATION OF UNTRUSTED GATEWAY WITHOUT DISCLOSURE OF PRIVATE INFORMATION

(75) Inventors: Ian G Angus, Mercer Island, WA (US); Rosanne P Pahm, Kirkland, WA (US); John Skinner, Renton, WA (US)

(73) Assignee: The Boeing Company, Chicago, IL (US)

( * ) Notice: Subject to any disclaimer, the term of this patent is extended or adjusted under 35 U.S.C. 154(b) by 1623 days.

(21) Appl. No.: 10/831,672

(22) Filed: Apr. 23, 2004

(65) Prior Publication Data

US 2005/0240774 A1 Oct. 27, 2005

(51) Int. Cl.
*H04L 9/32* (2006.01)

(52) U.S. Cl. ............ 713/168; 713/150; 713/176; 726/2; 726/3; 726/4; 709/223; 709/225

(58) Field of Classification Search .................. 726/2–4; 713/150, 168, 176; 709/223, 225
See application file for complete search history.

(56) References Cited

U.S. PATENT DOCUMENTS

| 6,104,716 | A  | * | 8/2000  | Crichton et al. ............. 370/401 |
|-----------|-----|---|---------|--------------------------------------|
| 6,198,824 | B1 | * | 3/2001  | Shambroom ................ 380/279   |
| 6,199,113 | B1 |   | 3/2001  | Alegre et al.                        |
| 6,286,046 | B1 | * | 9/2001  | Bryant ......................... 709/224 |
| 6,317,831 | B1 | * | 11/2001 | King ............................ 713/171 |
| 6,324,648 | B1 | * | 11/2001 | Grantges, Jr. .................... 726/12 |
| 6,584,567 | B1 | * | 6/2003  | Bellwood et al. ............. 713/171 |
| 6,715,082 | B1 | * | 3/2004  | Chang et al. .................. 726/8 |
| 6,725,376 | B1 | * | 4/2004  | Sasmazel et al. ............. 726/10 |
| 6,970,918 | B2 | * | 11/2005 | Brown et al. ................ 709/219 |
| 7,054,618 | B1 | * | 5/2006  | McCullough .............. 455/414.1 |
| 7,246,243 | B2 | * | 7/2007  | Uchida ......................... 713/186 |
| 7,330,971 | B1 | * | 2/2008  | Kukreja et al. ............... 713/168 |
| 7,451,312 | B2 | * | 11/2008 | Medvinsky et al. .......... 713/168 |
| 7,509,490 | B1 | * | 3/2009  | Hsu et al. ...................... 713/162 |

(Continued)

FOREIGN PATENT DOCUMENTS

WO WO/96/42041 12/1996

(Continued)

OTHER PUBLICATIONS

*Radius*, Jonathan Hassell, O'Reilly Media, Oct. 2002.

*Primary Examiner* — Yin-Chen Shaw
(74) *Attorney, Agent, or Firm* — Harness, Dickey & Pierce, P.L.C.

(57) ABSTRACT

A system and method provides user authorization for use of a server without providing the server with sensitive user information. A secure authorization link is established between a user interface and a remote authentication server. The authorization link passes through a local server while being unreadable by the local server. User authorization data is sent from the user interface to the authorization server, via the authorization link. The authorization server then returns a redirected validation message to the user interface, via the authorization link. A local link is established between the user interface and the local server based on data included in the redirected validation message. All communication between the user interface, the local server and authorization server is performed utilizing the user interface web browser. Thus, authorization for use of services controlled by the local server is accomplished without the need to load specialized software on the user interface for establishing such links and performing such communications.

35 Claims, 2 Drawing Sheets

U.S. PATENT DOCUMENTS

| | | | |
|---|---|---|---|
| 2003/0061404 A1* | 3/2003 | Atwal et al. | 709/328 |
| 2003/0081783 A1* | 5/2003 | Adusumilli et al. | 380/270 |
| 2003/0149880 A1* | 8/2003 | Shamsaasef et al. | 713/182 |
| 2003/0217288 A1* | 11/2003 | Guo et al. | 713/201 |
| 2004/0015725 A1* | 1/2004 | Boneh et al. | 713/201 |
| 2004/0117486 A1* | 6/2004 | Bourne et al. | 709/228 |
| 2005/0053026 A1* | 3/2005 | Mullan et al. | 370/316 |
| 2005/0076126 A1* | 4/2005 | Knight et al. | 709/227 |

FOREIGN PATENT DOCUMENTS

| | | |
|---|---|---|
| WO | WO/00/14987 | 3/2000 |

* cited by examiner

AUTHENTICATION OF UNTRUSTED GATEWAY WITHOUT DISCLOSURE OF PRIVATE INFORMATION

FIELD OF SYSTEM

The system relates generally to user authorization for connection to a local area network (LAN). More specifically, the system relates to a system and method for authorizing user access to a service controlled by a LAN server without providing the LAN server with confidential user information.

BACKGROUND

Local area and wide area network (LANs and WANs) are common place in today's world of high tech, omnipresent information access and communication availability. For example, mobile platforms such as aircraft, cruise ships, trains, buses and other moving vehicles often provide passengers with the capability of connecting to a LAN onboard the mobile platform. The mobile platform LANs typically offer the passenger use of many desirable services such as wireless connections to the Internet and/or remote ground based LANs or WANs. Generally, for a passenger to utilize such services the passenger is required to provide sensitive confidential information such as the passenger's name, credit card information, date of birth, home address and phone number. This confidential information is then generally stored in memory of the LAN and used to authorize the passenger to use the services available via the onboard LAN or authenticate the passenger's authorization, if previously authorized.

However, often times the onboard servers are not secure. That is, the onboard servers are not guarded from unauthorized and undesired physical and/or electronic access when not in use. For example, mobile platform LAN equipment, such as servers and storage devices, is often pulled off the mobile platform and put in a maintenance rack for storage in a low security facility. Thus, the confidential passenger information stored in the LAN memory is potentially vulnerable to unauthorized and undesired access, i.e. hacking. Additionally, such LANs are often vulnerable to being hacked while the LANs are in use. Therefore, the confidential user information is potentially vulnerable even if such user information is merely temporarily provided and not stored within the LAN.

Furthermore, many known LAN systems require that specialized software be loaded on the user's device, e.g. laptop computer, in order for the user to acquire authorization/authentication and access to a desired LAN controlled service. Thus, the user must connect to the LAN, download the specialized software program and then complete the authorization/authentication process. This is cumbersome and undesirable to the user and the LAN provider.

Therefore, it is very desirable to provide implementation of an authorization/authentication process that will not expose a user's private information to any piece of equipment on the LAN. It is further very desirable to provide such a process that will not require specialized authorization software to be loaded on the user's device

BRIEF SUMMARY

In one implementation a method is provided for authorizing use of a server without providing the server with sensitive user information. The method includes establishing a secure authorization link between a user interface and a remote authorization server. The authorization link passes through a local server while being unreadable by the local server. The method additionally includes sending user authorization data from the user interface to the authorization server, via the authorization link. The authorization server then returns a redirected validation message to the user interface, via the authorization link. The method further includes establishing a local link between the user interface and the local server based on data included in the redirected validation message. The authorization link and the local link are established using a web browser on the user interface. Additionally, all communication between the user interface, the local server and authorization server is performed utilizing the user interface web browser. Thus, authorization for use of services controlled by the local server is accomplished without the need to load specialized software on the user interface for establishing such links and performing such communications.

In another preferred form a communication system is provided. The communications system includes a connection port for connecting a user interface to a local area network (LAN). The LAN includes a local server having a processor and storage device having local server (LS) software stored thereon. The system additionally includes an authorization server located remotely from the local server and capable of communication with the local server via the Internet. The local processor executes the LS software to send a login notification from the local server to the user interface when the user interface is connected to the connection port. The user interface is generally connected to the connection port using an appropriate communications cable or wireless connection. The login notification is utilized by a user to request access to a service controlled by the local server. In response to the user request, the local processor executes the LS software to establish a secure authorization link between the user interface and the authorization server. The authorization link is established utilizing a web browser on the user interface without the need to load specialized software on the user interface. The authorization link passes through the local server but is unreadable by the local server. The local processor further executes the LS software to verify a redirected validation message containing authorization data sent by the authorization server. The redirected validation message is verified utilizing a public key of the authorization server. Furthermore, the local processor executes the LS software to establish a local link between the user interface and the local server. The local link is also established utilizing the user interface web browser without the need to load specialized software on the user interface.

The features, functions, and advantages of the present system can be achieved independently in various embodiments of the present system, or may be combined in yet other embodiments.

BRIEF DESCRIPTION OF THE DRAWINGS

The present system will become more fully understood from the detailed description and accompanying drawings, wherein.

DETAILED DESCRIPTION

The following descriptions of the preferred embodiments are merely exemplary in nature and is in no way intended to limit the system, its application or uses. Additionally, the advantages provided by the preferred embodiments, as described below, are exemplary in nature and not all preferred embodiments provide the same advantages or the same degree of advantages.

Figure 1:
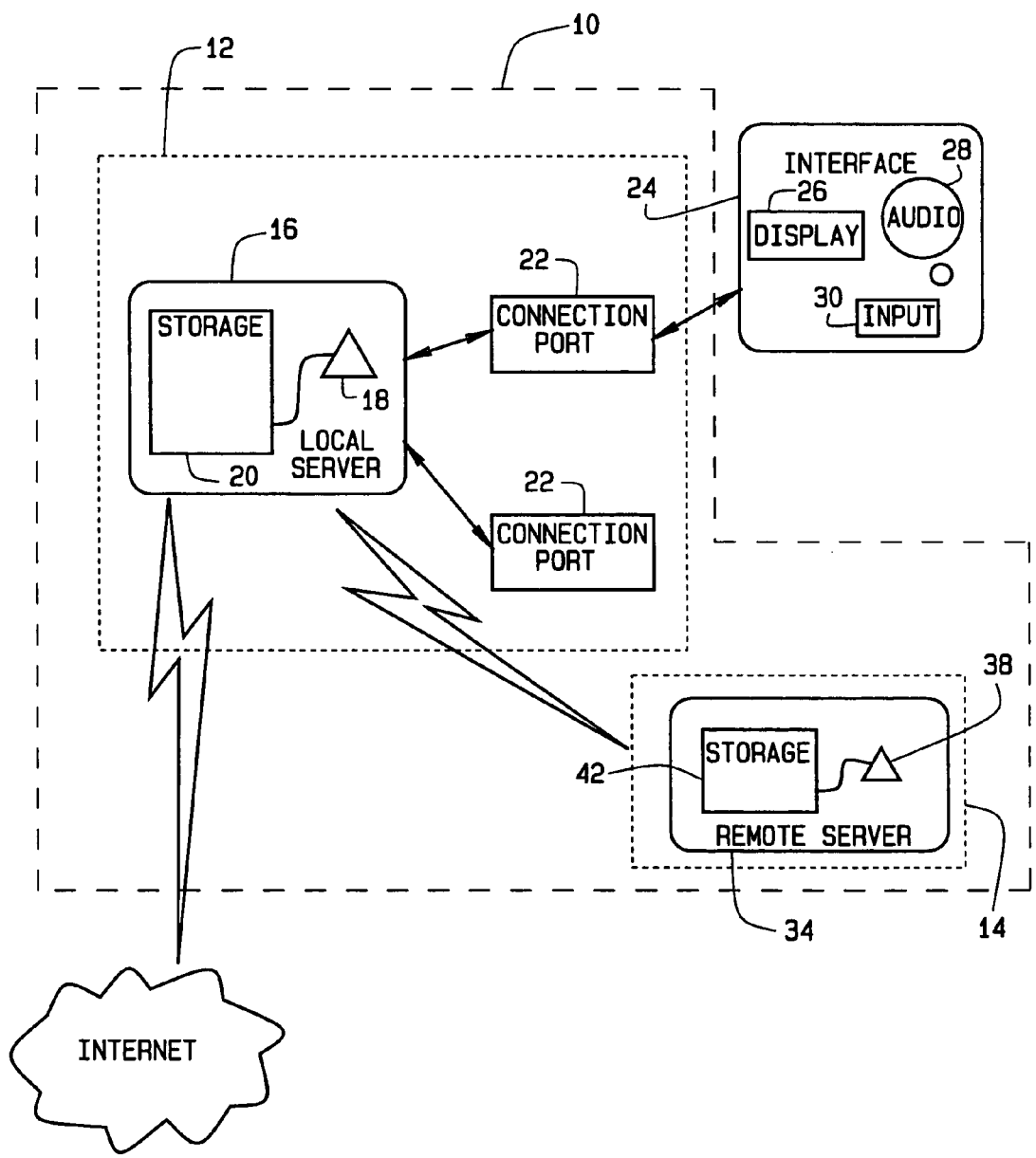
FIG. 1 is a simplified block diagram of a communications system for authorizing a user to access and use a service controlled by a local server.

FIG. 1 is a simplified block diagram of a communications system 10. The system 10 includes a local network 12, for example a local area network (LAN), and a remote network 14 that can also be a LAN or, alternatively, a wide area network (WAN). In one preferred form, the local network 12 is on board a mobile platform, such as an aircraft, cruise ship, train, bus or any other moving vehicle and the remote network 14 is a ground-based network. The local network 12 includes a local server 16 that includes a local processor 18 suitable to execute all functions of local server 16, and at least one local electronic storage device 20. The electronic storage device 20 preferably comprises a computer readable medium, such as a hard drive or any other electronic data storage device for storing such things as software packages or programs, algorithms, information and data. In an alternate embodiment, the electronic storage device 20 is independent of and electrically connected to the local server 16. Additionally, the local network 12 includes a plurality of connection ports 22 communicatively connected, e.g. hard wired or wirelessly connected, to the local server 16.

Each connection port 22 is adapted to communicatively connect to with a user interface 24, e.g. a hard wired or wireless connection. By connecting to a port 22 a user can establish an access link to the local server 16. For example, the user interface 24 can be a laptop computer of a passenger on board an aircraft. The passenger connects the laptop to one of the connection ports 22 to establish a link with the local server 16. The passenger can then utilize the link to access and use one or more services controlled by the local server 16. For example, a passenger can access the Internet via the local server 16.

Generally, each user interface 24 includes a display 26, an audio listening device 28 and a data input device 30. The display 26 is used for viewing such things as information, data and other graphical representations. The audio listening device 28 can be any suitable device for producing sound, such as a headset and jack or a speaker. The data input device 30 allows a passenger to input information, data and/or queries to the local server 16. For example, the data input device 30 can be a keyboard, a mouse or a touch screen included in the display 26. The communications system 10 is adapted to authorize a user for use of a service controlled by the local server 16 without disclosing sensitive confidential user information to the local server 16.

The remote network 14 includes a remote server 34, also referred to herein as the authorization server 34. The authorization server 34 includes a remote processor 38 suitable to execute all functions of authorization server 34. The authorization server 34 also includes at least one remote electronic storage device 42. The electronic storage device 42 preferably comprises a computer readable medium, such as a hard drive or any other electronic data storage device for storing such things as software packages or programs, algorithms, information and data. In an alternate embodiment, the electronic storage device 20 is independent of, and electrically connected to, the local server 16.

The local server 16 and the authorization server 34 communicate with each other using any suitable means of communication, for example land lines, a terrestrial wireless link or a satellite communication link. In a preferred form, communication between the local server 16 and the authorization server 34 is achieved using a satellite communication system and method such as that described in U.S. patent application Ser. No. 09/989,742, titled "Method and Apparatus for Providing Bi-Directional Data Services and Live Television Programming to Mobile Platforms", filed Nov. 20, 2001, and assigned to The Boeing Co.

The local server 16 provides and controls many services that users of the system 10 may desire to utilize. For example, a user may desire to access the Internet via the local server 16. Or, a user may desire to access information, games and/or other forms of entertainment, such as movies, stored on the storage module 20 and controlled by the local server 16. To access such services controlled by the local server 16, the user connects a user interface 24, such as a laptop computer, to the local network 12 via one of the connection ports 22. The user then enters login information and requests access to a desired service. The authorization server 34 then requests authorization information from the user. The system uses the authorization information provided by the user to either authorize access to the requested service, authenticate that the user has been previously approved to access the requested service, or deny access to the requested service. The authorization information requested from the user includes private, sensitive information that the user desires to keep very confidential. For example, the requested confidential information can include such things as the user's name, passwords, credit card information, date of birth, home address and phone number.

In order to keep the confidential user information confidential and secure, the system 10 authorizes or denies a user service request at the remote network 14. More specifically, the system 10 determines authorization without the confidential user information being read or stored by the local server 16. Additionally, the system 10 determines user authorization using a web browser (not shown) included in the user interface 24 without requiring that specialized authorization software, specific to system 10, be loaded on the user interface 24. That is, system 10 uses any generic web browser that is loaded on the user interface 24 prior to connecting the user interface 24 to connection port 22, to determine user authorization.

Specialized software, as used herein, is any software, other than the user interface 24 web browser. More specifically, the operation of system 10, as described herein, does not require that specialized software, specifically designed for use with the system 10, be loaded or downloaded on the user interface 24. A user only needs to have a generic web browser, which is typically standard software preloaded on most of today's computer based devices, to utilize the system 10, as described herein.

Figure 2:
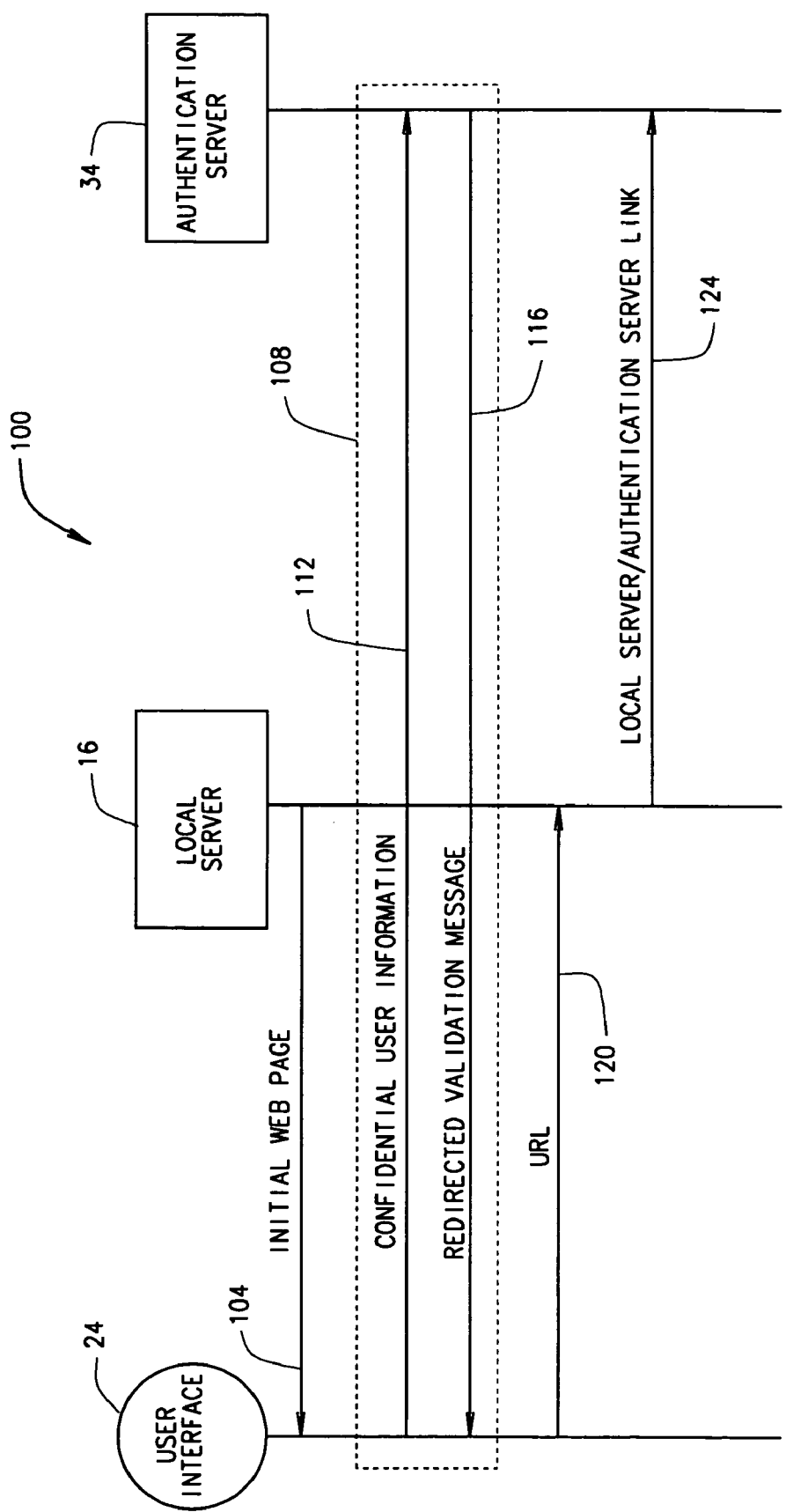
FIG. 2 is a sequence diagram illustrating a sequence of actions performed by the system shown in FIG. 1 to determine whether to authorize a user request to access a service controlled by a local server shown in FIG. 1.

FIG. 2 is a sequence diagram 100 illustrating a sequence of actions performed by the system 10 to determine whether to authorize a user request to access a service controlled by the local server 16. Once the user connects to the local network 12 via a connection port 22, the local server 16 sends a login notification, e.g. an initial web page, to the user interface 24 containing a link to a login web page to be hosted on the user interface display 26, as indicated at 104. Alternatively, the local server 16 sends to the user interface 24 the login web page at 104. Via the login web page, the user requests access to one or more services controlled by the local server 16.

Utilizing the web browser on the user interface 24, a secure authorization link 108 is established between the user interface and the remote authorization server 34. More specifically, an encrypted session is opened between the user interface 24 and the remote authorization server 34. The secured authorization link 108 is provided using a certificate of the authorization server 34 that is presented to the user interface 24. In a preferred embodiment, the authorization link 108 is a hyper text transfer protocol secure sockets (https) tunnel.

The local server 16 includes software stored on the storage device 20 that explicitly allows the authorization link 108 to pass through the local server 16 without being read by the local server 16. That is, the authorization link 108 passes through the local server 16, but is unreadable by the local server 16. Specifically, the local server 16 can see and record data sent via the authorization link 108, but the local server can not reconstruct the data. The software on the local server 16 also implements access control mechanisms that only allow an authorized user access beyond the local network 12. Additionally, although the authorization link 108 is allowed to pass through the local server 16, in a preferred implementation, the software on the local server 16 blocks access to selected Internet links while allowing access to selected other Internet links. For example, the local server 16 software may allow access to customer service related links, free chat rooms and specific mobile platform information related links while blocking access to all other Internet links. In another preferred form, the software on the local server 16 allows the authorization link 108 to pass through the local server 16 while blocking all other access to the Internet. Any data or information that the local server 16 needs to pass to the authorization server 34, such as a user interface IP address, can be passed as part of the initial web page sent at 104. In one preferred embodiment, the local server 16 sends this additional data in encrypted form.

Once the secure authorization link 108 is established, the authorization server 34 requests private and confidential user authorization data from the user. The user then uses the user interface input device 30 to enter the authorization data, as indicated at 112. In one preferred embodiment, the authorization data includes such things the user's name, credit card information, date of birth, home address and phone number. In an alternative embodiment, a user may have been previously authorized for use of specific services controlled by the local server 16. In which case, the user authorization data may include only a username and password used to authenticate the user. The authorization server 34 uses the user authorization data to determine whether to authorize or deny the user to access the requested service. Once the authorization server 34 determines whether the user is authorized, the authorization server 34 constructs a redirected validation message that is sent to the user interface 22, via the secure authorization link 108, as indicated at 116. Thus, the redirected validation message is passed through the local server 16 to the user interface 24. However, the local server 16 is unable to read the redirected validation message as the redirected validation message passes through in route to the user interface 24 because the validation message is inside the encrypted session 108. In a preferred form, the authorization server 34 constructs a hyper text transfer protocol (http) redirected validation message that is sent to the user interface 24, via the authorization link 108. Alternatively, the authorization server 34 can construct a hyper text transfer protocol secure sockets (https) redirected validation message that is sent to the user interface 24, via the authorization link 108.

The redirected validation message contains data commands that instruct the user interface 24 to immediately forward the redirected validation message on to the local server 16, as indicated at 120. Thus, a local link is established at 120 between the user interface 24 and the local server 16. In a preferred form, the http protocol redirected validation message utilizes a local server certificate to suppress dialog windows from being displayed on the user interface display 26. Thus, the redirected validation message is transparent to the user. The redirected validation message additionally contains a uniform resource locator (URL) that indicates whether the user has been authorized to access the requested service. Once the redirected validation message has been forwarded to the local server 16, the software on the local server 16 now allows the local server 16 to read the redirected validation message. The information contained in the URL is used by the local server 16 to either enable or prevent the user access to the requested service. For example, if the user obtains authorization, the URL contains such things as session identification data, what service(s) is/are allowed and how long to provide the user access to the service(s). Additionally, the URL can contain the IP address of the user interface 24 so that the local server 16 can compare the IP address in the URL with the IP address already known by the local server 16 to verify that the redirected validation message can be trusted.

Alternatively, the authorization server 34 can construct the redirected validation message in a Java Script format. In this embodiment, the redirected validation message is not done at the http protocol level, but rather a page is loaded into the user interface web browser. Upon the loading of this page, a small script contained within the loaded page is executed that effects the redirection. This approach has the advantage of letting the passenger see what is happening without being exposed with any potentially disturbing messages regarding security status.

Further yet, the redirected validation message is digitally signed using a private key of the authorization server 34 so that the local server 16 can use the public key of the authorization server 34 to verify that the redirected validation message can be trusted. Alternatively, the redirected validation message is encrypted and must be decrypted by the local server 16 after the validation message is forwarded to the local server 16 by the user interface 24. Digitally signing and/or encrypting the redirected validation message prevents an unintended user, i.e. a hacker, from capturing the validation message and using it at a later time. Still further yet, in a preferred form, the redirected validation message has a time stamp embedded in the validation message. The time stamp limits the duration the redirected validation message is valid such that if the authorization data contained in the redirected validation message is somehow captured by a hacker, it can only be used for a predetermined time period, for example 10 microseconds to 10 minutes. Preferably, the time stamp is provided by the authorization server 34 and the local server 16 is required to honor the time stamp. This allows for the time stamp to be easily adjusted.

In one preferred form, the local link at 120, whereby the redirected validation message forwarded from the user interface to the local server 14, is an unsecured link. That is, the forwarded redirected validation message is unencrypted. However, the redirected validation message does not contain any confidential user information. Thus, even if the redirected validation message is eavesdropped at 120, no confidential information can be obtained. Alternatively, the local link at 120 can be a secured link, such that redirected validation message is forwarded to the local server 16 in an encrypted form. For example, the redirected validation message can be forwarded from the user interface 24 to the local server 16 using an https connection.

The redirected validation message is forwarded from the user interface 24 to the local server 16 using the user interface web browser without the need to have specialized software, i.e. software specific to the system 10, loaded on the user interface 24. More specifically, the system 10 provides secure user authorization/authentication absent the use of any specialized software loaded on the user interface. Thus, the user does not have to connect to the system 10 then download specialized software to the user interface 24 to obtain authorization to access desired service(s) controlled by the local server 16. Furthermore, the system 10 does not utilize cookies or store cookies on the user interface 24 during the user authorization process. Therefore, cookies can be disabled within the user interface web browser without interfering with the operation of the system 10. Thus, once the user has been authorized to access a requested service, i.e. the service is turned on by the local server 16, the user can close the user interface web browser without interrupting the service. Furthermore, the user could turn the user interface 24 off and on again and the service will still be enabled.

In one preferred embodiment, after the redirected validation message has been forwarded to the local server 16 at 120, the local server 16 communicates with the authorization server 34 via a secured link, as indicated at 124. The link at 124 provides a communication channel between the local server 16 and the authorization server 34 for such things as the local server 16 informing the authorization server 34 that the redirected validation message has been successfully received. Or, the link at 124 can be used by the authorization server 34 to identify the local server 16. That is, the authorization server 34 can identify whether the local server 16 was located on a mobile platform, e.g. an aircraft, or whether the local server 16 is a ground based server.

Thus, the system 10 provides a user authorization process that does not expose the user's private, confidential information to any piece of equipment on the local network 12. Additionally, the system 10 provides the user authorization without the need to download specialized authorization software to the user interface 24.

While the system has been described in terms of various specific embodiments, those skilled in the art will recognize that the system can be practiced with modification within the spirit and scope of the claims.

What is claimed is:

1. A method for authorizing use of a server on a mobile platform without providing the server with sensitive information, said method comprising:
   providing a local server having no encryption capabilities and no decryption capabilities;
   establishing a secure authorization link between a user interface and a remote authorization server utilizing a user interface web browser, the local server being configured between the user interface and the remote authorization server such that all communications between the user interface and the remote authorization, including the authorization link, are required to pass through the local server, and where the authorization link is unreadable by the local server;
   sending user authorization data from the user interface to the authorization server, via the authorization link, and through the local server without any encryption or modification of the user authorization data by the local server, and by utilizing the user interface web browser;
   returning a redirected validation message from the authorization server through the local server to the user interface, via the authorization link, with the redirected validation message being unreadable by the local server, the redirected validation message further including a uniform resource locator (URL) that includes information useable by the local server to permit or deny access to a requested service;
   using the redirected validation message to provide an instruction to the user interface that causes the user interface to automatically forward the redirected validation message back to the local server, the redirected validation message including data for authorizing use of the local server by the user interface to enable the user interface to access the requested service; and
   using the local server to receive the forwarded, redirected validation message, which causes the local server to establish an unsecured local link between the user interface and the local server based on the data included in the redirected validation message, the local link established utilizing the user interface web browser, and the local server adapted to read only unencrypted communications received from the user interface.

2. The method of claim 1, wherein the method further comprises providing a user access to a requested service controlled by the local server once the local link is established.

3. The method of claim 1, wherein the method further comprises sending data from the local server to the authorization server via the secure authorization link.

4. The method of claim 1, wherein said establishing a secure authorization link between the user interface and the authorization server comprises sending a login notification from the local server to the user interface, the login notification utilized by a user to request access to the requested service controlled by the local server.

5. The method of claim 1, wherein said returning a redirected validation message comprises validating the user authorization data utilizing the authorization server.

6. The method of claim 1, wherein said establishing a local link comprises verifying the redirected message is valid using a public key of the authorization server and a digital signature attached to the redirected message.

7. The method of claim 1, wherein said forwarding the redirected validation message comprises encrypting the forwarded redirected validation message.

8. The method of claim 1, wherein said establishing a secure authorization link comprises establishing the authorization link absent specialized software on the user interface for establishing the authorization link.

9. The method of claim 1, wherein said sending a login notification comprises sending a login page from the local server to the user interface.

10. The method of claim 1, wherein said sending a login notification comprises sending a link to a login page from the local server to the user interface.

11. The method of claim 1, wherein said establishing a secure authorization link comprises establishing an https session between the user interface and the authorization server.

12. The method of claim 1, wherein said establishing a secure authorization link comprises providing the authorization link while blocking access to a plurality of selected Internet links.

13. The method of claim 1, wherein said establishing a secure authorization link comprises sending communication identification data regarding the user interface from the local server to the authorization server.

14. The method of claim 13, wherein said sending communication identification data comprises encrypting the communication identification data sent.

15. The method of claim 1, wherein said establishing a secure authorization link server comprises sending user login information from the user interface to the authorization server.

16. The method of claim 1, wherein said returning a redirected validation message comprises constructing an http redirected validation message using the authorization server.

17. The method of claim 1, wherein returning a redirected validation message comprises constructing a script redirected validation message using the authorization server.

18. The method of claim 1, wherein said returning a redirected validation message comprises sending authorization and authorized service related data from the authorization server to the local server.

19. The method of claim 1, wherein said establishing the local link comprises establishing the local link while cookies are disabled within the user interface web browser.

20. The method of claim 1, wherein said returning a redirected validation message comprises embedding in the redirected validation message a time stamp adapted to limit the duration the validation message is valid.

21. A communication system comprising:
a connection port adapted to provide a connection for a user interface;
a remote authorization server;
a local server on a mobile platform including a local processor and a local storage device having local server (LS) software stored thereon executable by the local processor, the local server being configured between the user interface and the remote authorization server such that all communications between the user interface and the remote authorization are required to pass through the local server, and where a secure authorization link sent from the remote authorization server is unreadable by the local server and the local server is devoid of encryption and decryption capabilities, and wherein the local processor is configured to:
execute the LS software to send a login notification from the local server to the user interface when the user interface is communicatively connected to the connection port, wherein the login notification is utilized by a user to make a user request that requests access to a service controlled by the local server;
execute the LS software to establish the secure authorization link between the user interface and the authorization server in response to the user request, wherein the authorization link is established utilizing a user interface web browser absent other specialized software stored in the user interface for establishing the authorization link, the authorization link passing through the local server, without any encryption being applied by the local server, and being unreadable by the local server;
use the authorization server to generate a redirected validation message that is sent over the authorization link back to the user interface web browser, through the local server without being read or encrypted by the local server, the redirected validation message containing user authorization data and verified utilizing a public key of the authorization server, and the redirected validation message further including a uniform resource locator (URL) that includes information useable by the local server to permit or deny access to a requested service;
use the user interface web browser to recognize an instruction in the redirected validation message to forward the redirected validation message, without requiring a response by the user via the user interface web browser, back to the local server;
use the local server to execute the LS software to verify the redirected validation message sent by the authorization server, the redirected validation message being verified utilizing a public key of the authorization server; and
use the software to execute the LS software to establish an unsecured local link between the user interface and the local server according to the authorization data, the link established utilizing the user interface web browser absent other specialized software stored in the user interface for establishing the local link, and the local server adapted to read only unencrypted communications from the user interface.

22. The system of claim 21, wherein the local processor is further configured to execute the LS software to enable the user to have access to the requested service controlled by the local server, the requested service identified in the redirected validation message.

23. The system of claim 21, wherein the authorization server comprises a remote processor and a remote storage device having authorization server (AS) software stored thereon executable by the remote processor, wherein the remote processor is configured to: execute the AS software to validate the user authorization data sent from the user interface to the authorization server via the authorization link; and execute the AS software to return a redirected validation message to the user interface, via the authorization link, the validation message including authorization and data related to the requested service, wherein the validation message is forwarded by the user interface to the local server utilizing the user interface web browser absent other specialized software stored in the user interface for communicating with the local server.

24. The system of claim 21, wherein the local processor is further configured to execute the LS software to establish the secure authorization link comprising an https session between the user interface and the authorization server.

25. The system of claim 21, wherein the local processor is further configured to execute the LS software to establish the secure authorization link while blocking access to various selected Internet links.

26. The system of claim 21, wherein the local processor is further configured to execute the LS software to establish the local link while cookies are disabled within the user interface web browser.

27. The system of claim 21, wherein the remote processor is further configured to execute the AS software to return the redirected validation message comprising an embedded time stamp adapted to limit the duration the redirected validation message is valid.

28. The system of claim 21, wherein the remote processor is further configured to execute the AS software to return the redirected validation message comprising a digital signature.

29. The system of claim 28, wherein the local processor is further configured to execute the LS software to validate the authenticity of the redirected validation message using the digital signature and a private key of the authorization server.

30. A method for authorizing use of a service controlled by an onboard server of an aircraft without disclosing confidential information to the onboard server, said method comprising:
configuring the onboard server without encryption capability and without decryption capability, and such that the onboard server is disposed between a user interface having a web browser and a remotely located ground based server;

sending a login notification from the onboard server to the user interface, the login notification utilized by a user to request access to the service controlled by the onboard server;

establishing a secure authorization link between the user interface and the ground based server, the authorization link being established utilizing the user interface web browser absent other specialized software stored in the user interface for establishing the authorization link, the authorization link passing through the onboard server and being unreadable by the onboard server;

sending user authorization data from the user interface to the ground based server via the authorization link, the authorization data passing through the onboard server without being encrypted or read by the onboard server, and utilizing the user interface web browser absent other specialized software stored in the user interface for establishing the authorization link;

validating the user authorization data utilizing the ground based server;

causing the ground based server to generate and send a redirected validation message back to the user interface using the authorization link, the redirected validation message including authorization and authorized service related data including a uniform resource locator (URL) that includes information useable by the local server to permit or deny access to a requested service, the redirected validation message being transmitted within the authorization link and passing through the onboard server but being unreadable by the onboard server;

including an instruction in the redirected validation message that causes the user interface web browser to automatically forward the redirected validation message, upon receipt thereof, back to the onboard server without requiring specialized software stored in the user interface for communicating with the onboard server;

using the onboard server to verify that the redirected validation message received from the user interface web browser is valid by utilizing a public key of the ground based server; and establishing an unsecured local link between the user interface and the onboard server utilizing the user interface web browser absent other specialized software stored in the user interface for communicating with the onboard server, the onboard server being able to read only unencrypted communications from the user interface.

31. The method of claim 30, wherein said establishing a secure authorization link comprises establishing an https session between the user interface and the ground based server using a certificate of the ground based server.

32. The method of claim 30, wherein said establishing a secure authorization link comprises providing the secure link while blocking access to a plurality of selected Internet links.

33. The method of claim 30, wherein said returning a redirected validation message comprises constructing one of an http redirected validation message and a Java Script redirected validation message using the ground based server.

34. The method of claim 30, wherein said establishing the local link comprises establishing the local link while cookies are disabled within the user interface web browser.

35. The method of claim 30, wherein said forwarding the redirected validation message back to the onboard server comprises embedding in the redirected validation message a time stamp adapted to limit the duration the validation message is valid.

* * * * *